Nov. 16, 1965 J. W. WARBURTON II 3,217,688
MARINE OUTDRIVE
Filed April 22, 1963 8 Sheets-Sheet 6
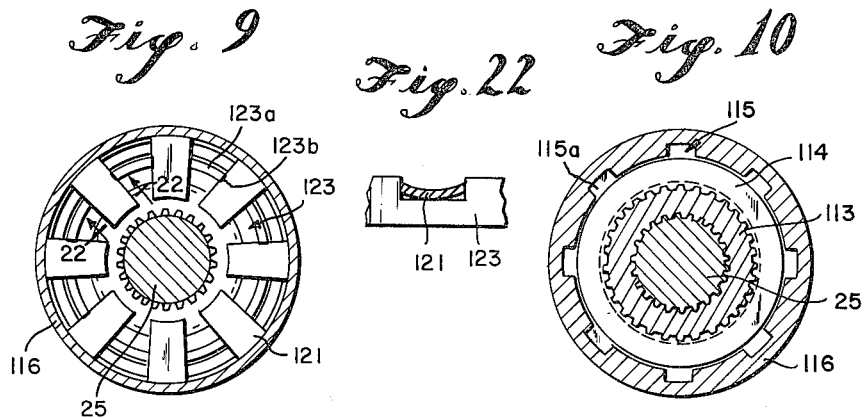
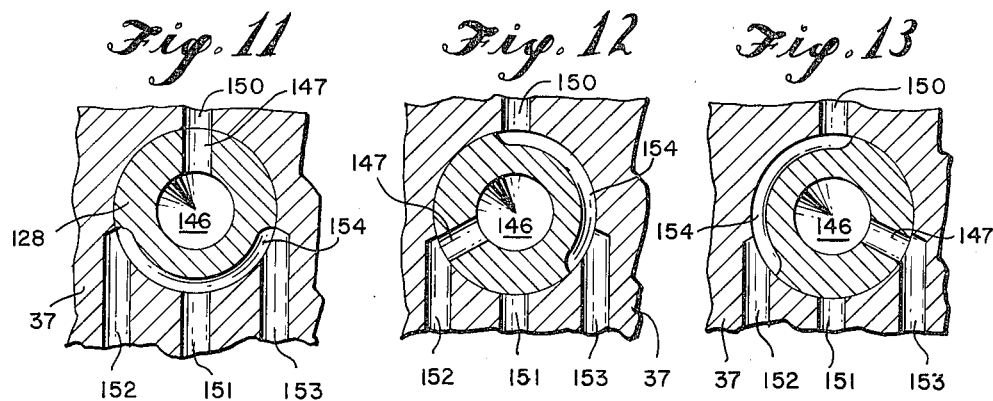
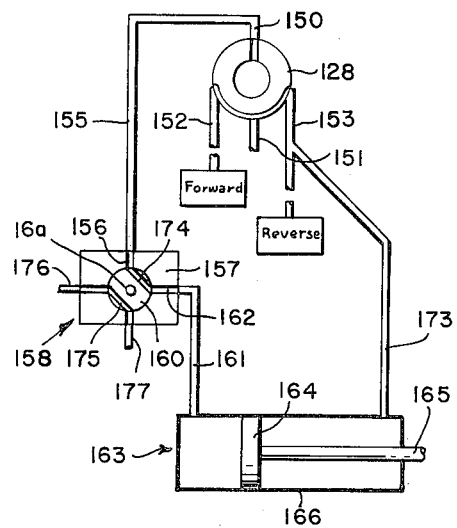
JOHN W. WARBURTON II
INVENTOR.
BY Seed & Berry
ATTORNEYS Nov. 16, 1965       J. W. WARBURTON II       3,217,688
MARINE OUTDRIVE
Filed April 22, 1963                         8 Sheets-Sheet 7

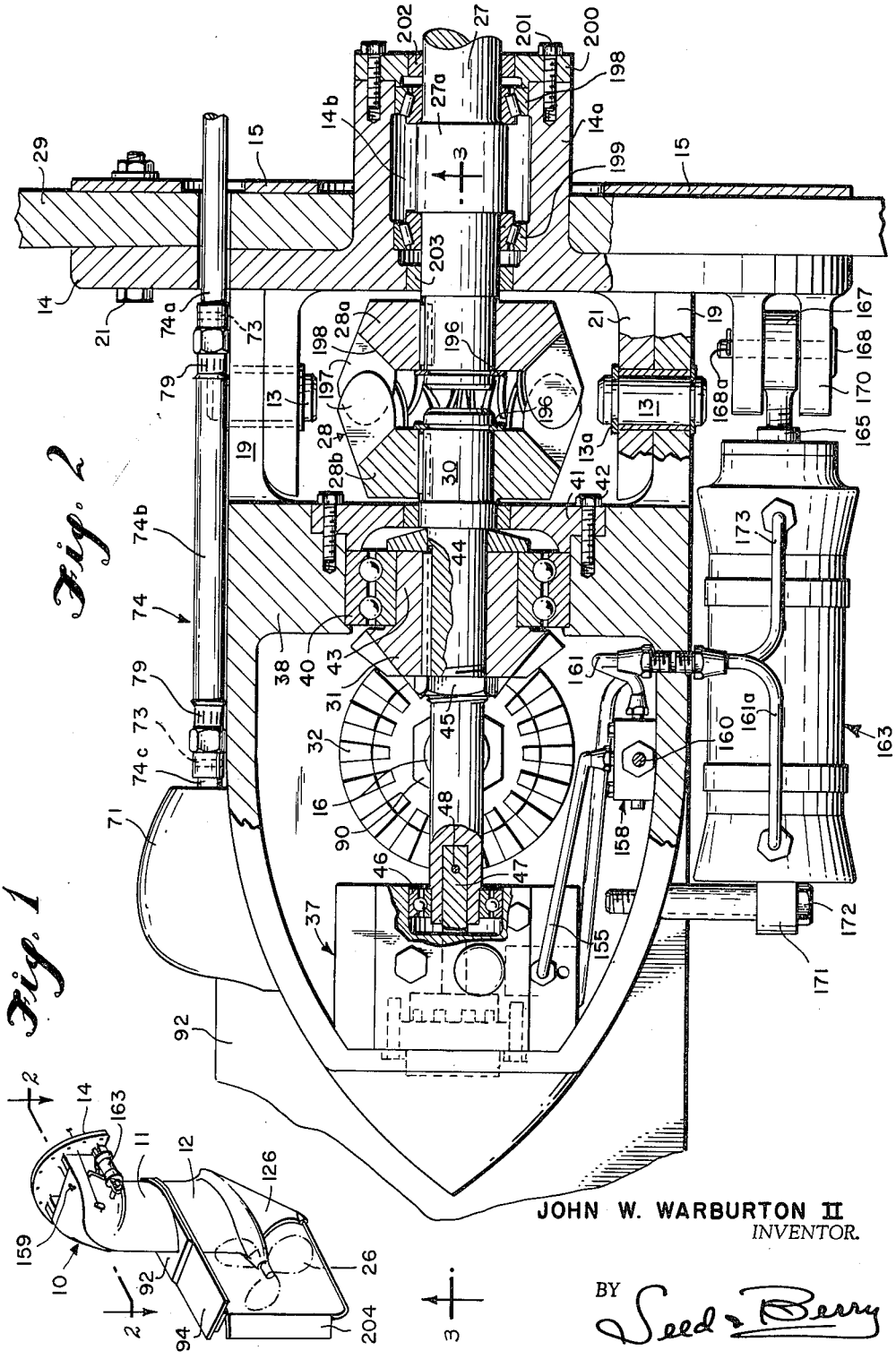

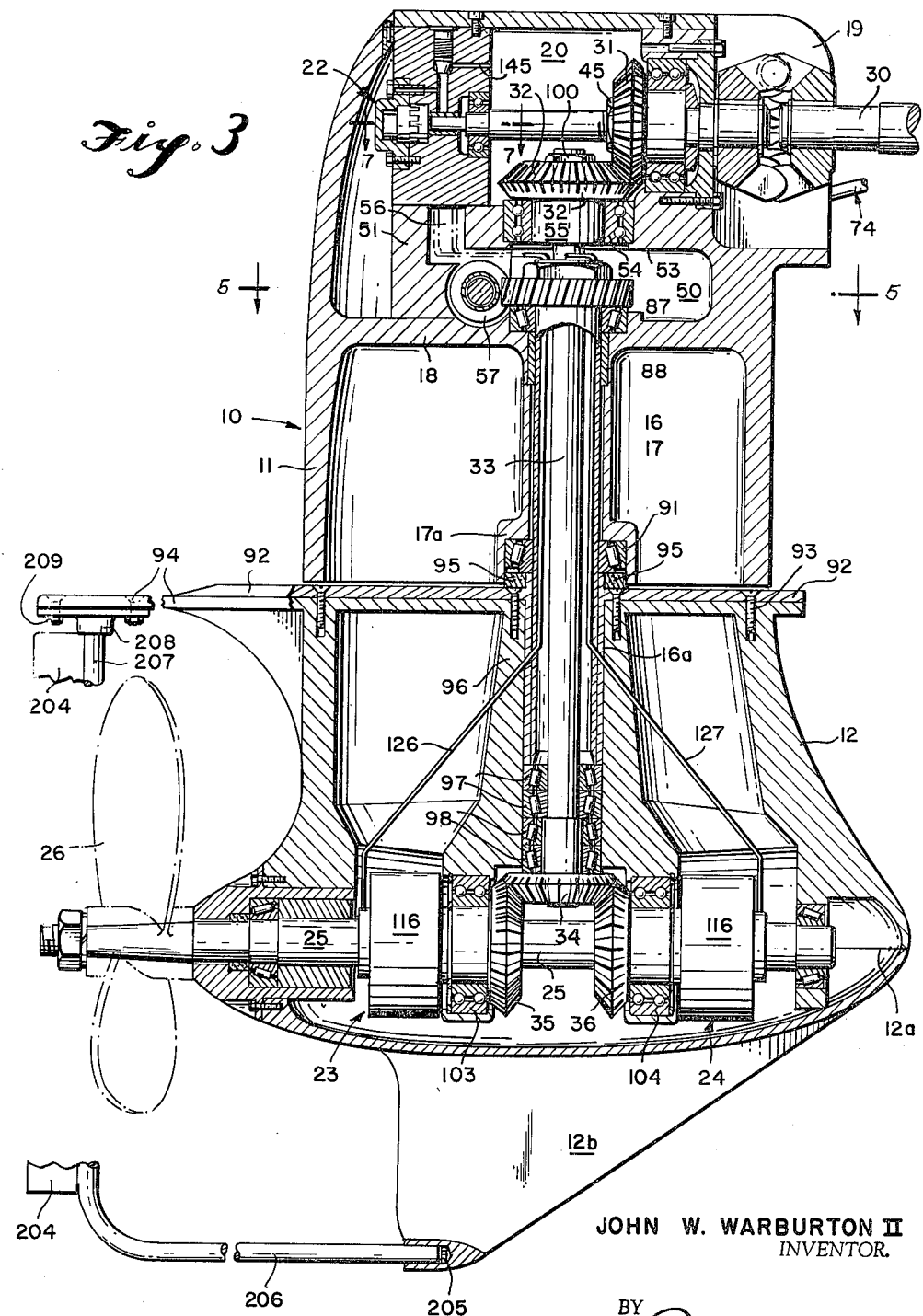

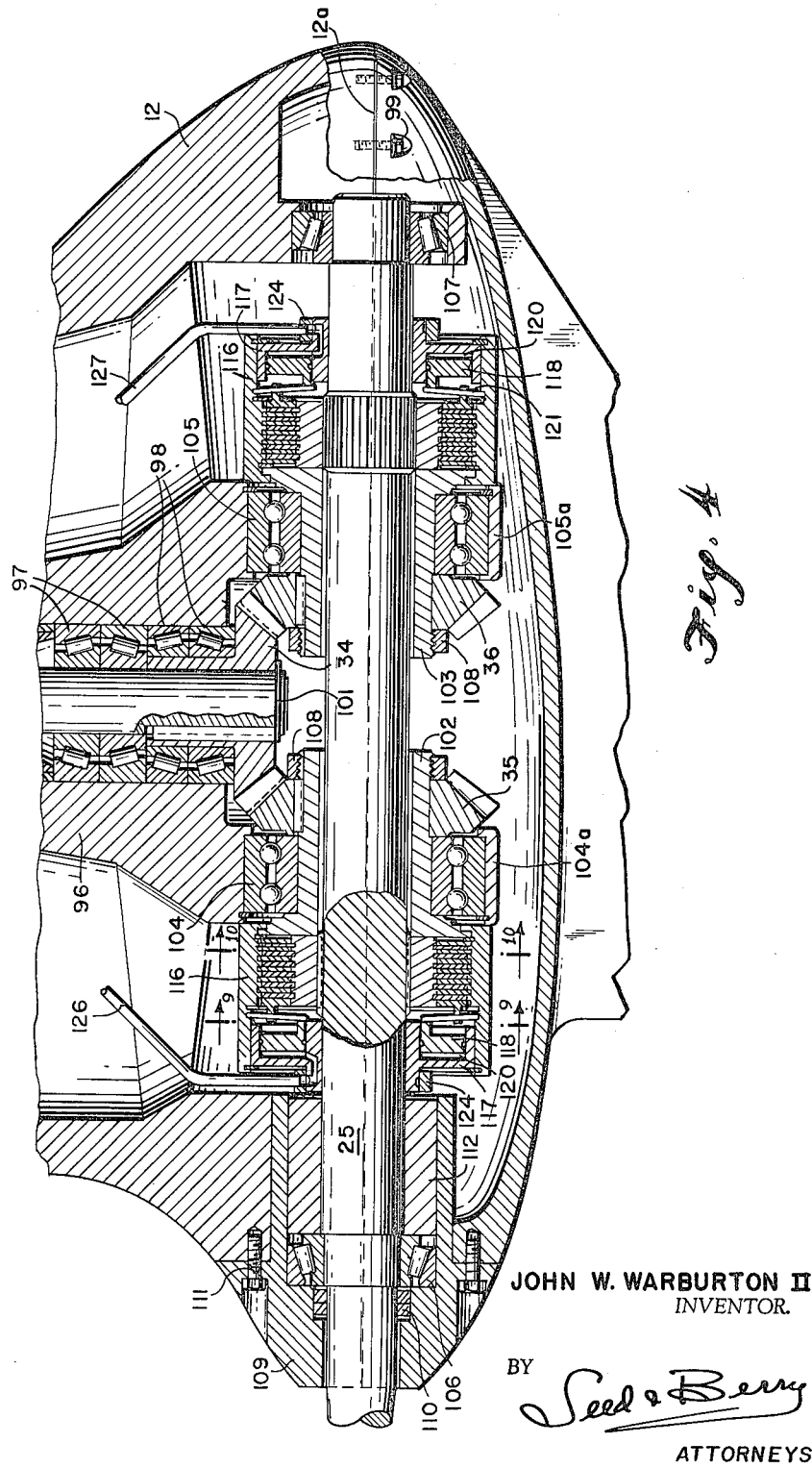

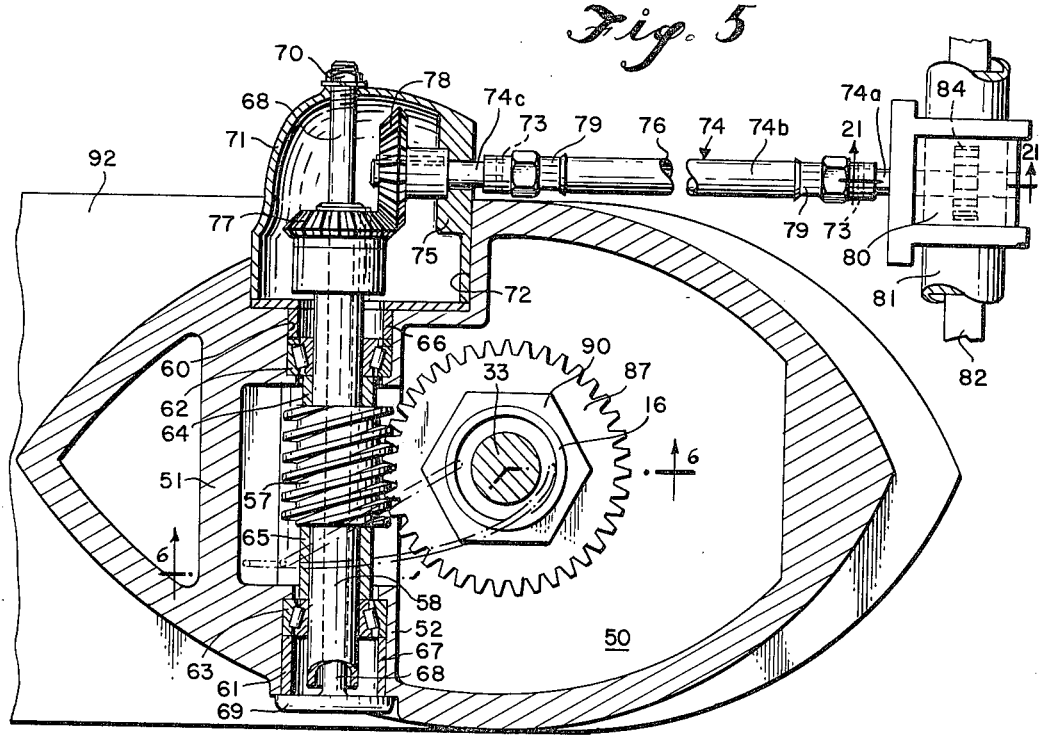
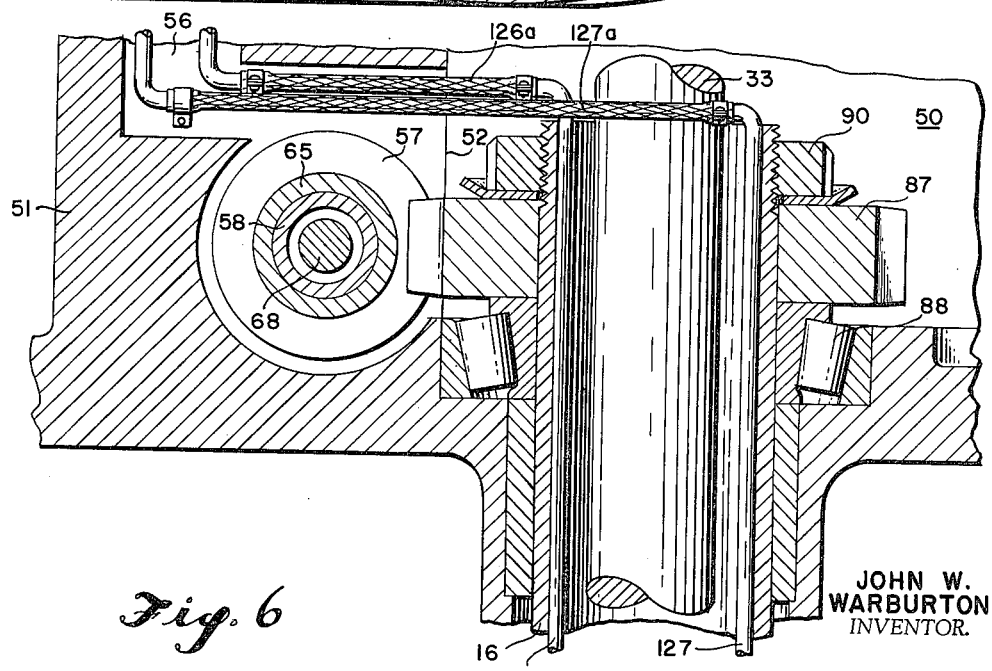

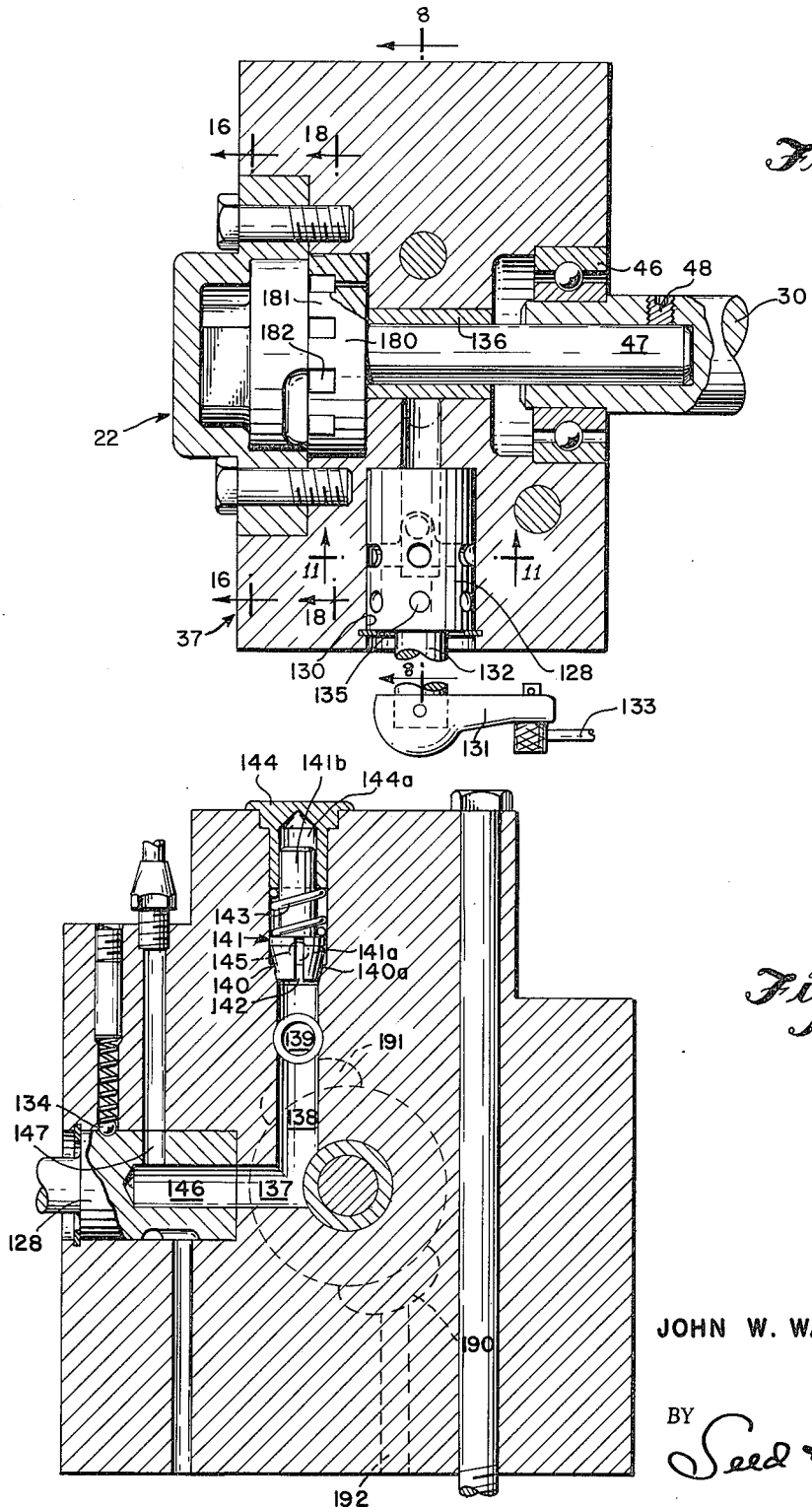

JOHN W. WARBURTON II
INVENTOR.

BY *Seed & Berry*

ATTORNEYS

Nov. 16, 1965　　　J. W. WARBURTON II　　　3,217,688
MARINE OUTDRIVE
Filed April 22, 1963　　　　　　　　　　　8 Sheets-Sheet 8
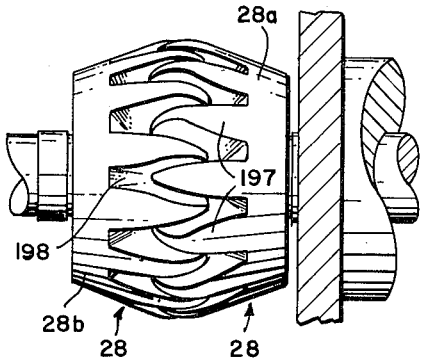
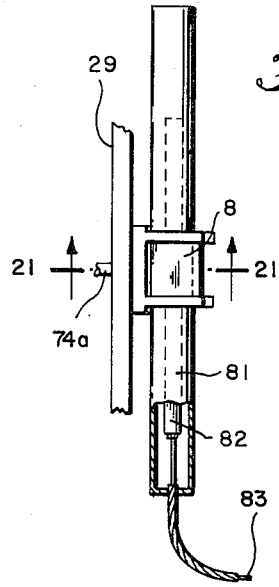
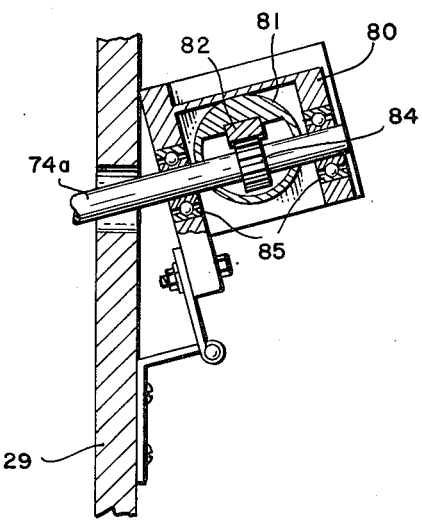
JOHN W. WARBURTON II
*INVENTOR.*
BY *Seed & Berry*
ATTORNEYS

3,217,688
MARINE OUTDRIVE
John W. Warburton II, Kirkland, Wash., assignor, by mesne assignments, to Hydro Drive Corporation, a corporation of Washington
Filed Apr. 22, 1963, Ser. No. 274,662
28 Claims. (Cl. 115—41)

The present invention relates to marine outdrives, and particularly to the through-transom type in which a drive shaft from an inboard engine passes rearwardly through the transom to an outboard power leg having a steerable propeller and provision for tilt-up.

An important object of the invention is to provide an outdrive with hydraulic gear shift for both forward and reverse which is completely contained in terms of clutches, hydraulic pressure source, and sump, within the outdrive, and yet is compact and shaped to minimize water resistance.

A further object is to provide such an outdrive which can be hydraulically lifted and locked in the up position when desired, and which is hydraulically locked automatically when the drive is in reverse.

Another object is to provide such an outdrive which has means for absorbing shock from tilt-up and tilt-down when in a forward drive condition.

The invention also aims to provide an outdrive which can be easily installed and demounted, and which permits a wide choice in the location of the associated inboard engine.

An additional object is to provide an outdrive having smooth, positive steering and which has provision for countering the reaction torque of the propeller.

Other objects and advantages in view will appear and be understood in the following description and claims, the invention consisting in the novel construction and in the adaptation and combination of parts hereinafter described and claimed.

In the accompanying drawings:

FIG. 1 is a perspective view of an outdrive unit embodying the present invention.

FIG. 2 is a horizontal sectional view taken as indicated by the line 2—2 of FIG. 1.

FIG. 3 is a longitudinal vertical sectional view taken along the line 3—3 of FIG. 2.

FIG. 4 is a detail longitudinal vertical sectional view of the lower part of the power leg.

FIG. 5 is a horizontal sectional view to an enlarged scale taken on the line 5—5 of FIG. 3.

FIG. 6 is a detail vertical sectional view taken as indicated by the line 6—6 of FIG. 5.

FIG. 7 is an enlarged horizontal sectional view through the control block taken along the line 7—7 of FIG. 3.

FIG. 8 is a transverse vertical sectional view taken along the line 8—8 of FIG. 7.

FIGS. 9 and 10 are detail vertical sectional views taken as indicated by lines 9—9 and 10—10, respectively of FIG. 4.

FIGS. 11, 12 and 13 are schematic views through the selector valve taken generally as indicated by line 11—11 in FIG. 7 and showing the neutral, forward, and reverse positions thereof, respectively.

FIG. 14 is a schematic view of the hydraulic system for the outdrive unit.

Figure 15:
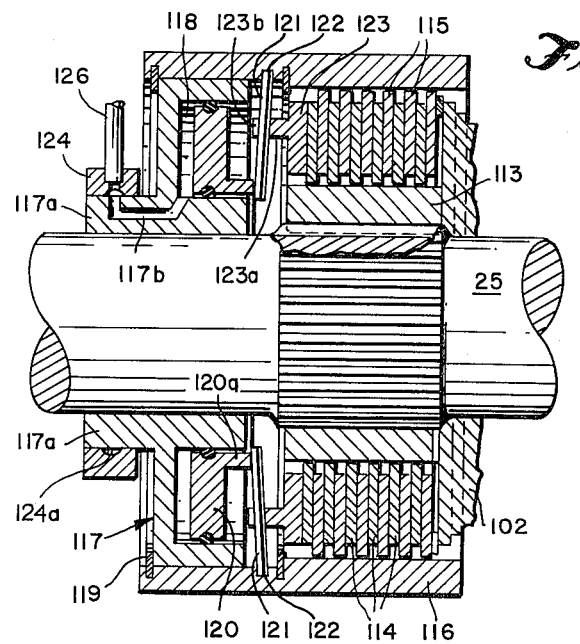

FIG. 15 is an enlarged longitudinal vertical sectional view of the forward clutch.

Figure 17:
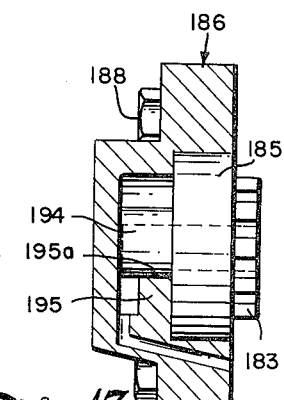
Figure 16:
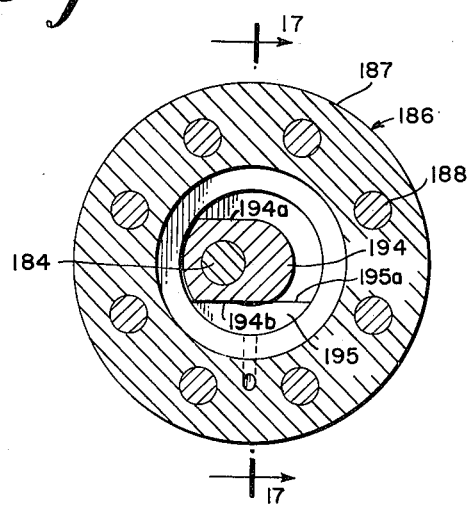
Figure 18:
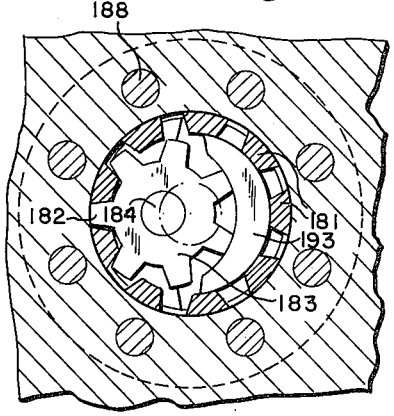

FIGS. 16, 17 and 18 are vertical sectional views taken on the lines 16—16, 17—17 and 18—18 of FIGS. 7, 16 and 7, respectively.

FIG. 19 is a top plan view of the coupling.

FIG. 20 is a top plan of the steering assembly forwardly of the transom.

FIG. 21 is an enlarged vertical sectional view taken on line 21—21 of FIG. 20, and FIG. 22 is a detail sectional view taken on line 22—22 of FIG. 2.

Referring to the drawings, it is seen that the outdrive of the present invention has a power leg 10 pivoted for tilt-up on pins 13 passing laterally through forwardly projecting ears 19 on the power leg and rearwardly extending lugs 21 on a mounting plate 14. This plate is in turn bolted with a back-up plate 15 to the transom 29 of the related boat hull. The power leg comprises upper and lower housings 11–12, with the upper housing being stationary steeringwise while the lower housing steers by turning of an upright hollow post 16 in an elongated boss 17 which depends from a central cross-wall 18 in the upper housing. This cross-wall is the floor of an oil sump 20 for a Tuthill self-reversing pump 22 which provides pressure fluid for operating forward and reverse hydraulic disc-type clutches 23–24 on the drive shaft 25 for the propeller 26. Power from the output shaft 27 of the engine (not shown) to the clutched propeller shaft 25 transferred via a coupling 28, input shaft 30, upper bevel gears 31–32, vertical shaft 33, lower pinion 34 and forward and reverse bevel gears 35–36, respectively. It will be noted that the input shaft 30 drives the oil pump 22 as well as the upper pinion 31 and that the oil pump is mounted in a fluid control block 37.

Returning with more particularity to the upper housing 11, the front wall 38 of the oil reservoir 20 is bored and counter-bored to receive a ball bearing unit 40 and a retainer 41 bolted at 42. The inner race of the bearing 40 is sleeved on the hub 43 of the pinion 31 and bears at the front against a spacer 44 in turn shouldering against a step at the head of the input shaft 30. A nut 45 on the latter holds the pinion 30 in position. As best seen in FIG. 7, at its rear end the shaft 30 is necked for a bearing 46 housed in the block 37 and has a center bore to receive the input shaft 47 of the pump 22. This pump shaft 47 is locked to the shaft 30 as by a set screw 48.

The sump 20 has a base cavity 50 spaced forwardly from the rear wall 51 of the sump by a transverse wall 52 and separated at the top from the sump proper by a divider wall 53. This wall is bored to receive a ball bearing unit 54 for the hub 55 of the upper gear 32 and has a through passage 56 beneath the block 37.

Directing attention to FIG. 5 it is seen that the base cavity 50 is reduced in width at the rear and receives a steering worm 57 mounted on a hollow shaft 58 which extends by its ends through side bores 60–61 housing thrust roller bearing units 62–63 for the shaft. Spacers 64–65 are located between the hub of the worm 57 and the inner races of the bearings 62–63, and the bores 60–61 are necked at their inner opposed ends to provide shoulders for the outer races of the bearings. At their outer ends these bores 60–61 receive spacers 66–67 which are retained by action of a tie rod 68 passing longitudinally through the worm shaft 58. At its right hand end this tie rod has a disc head 69 for retaining the spacer 66 and its other end is threaded for a nut 70 which holds a gear case 71 within a recess 72 in the left side of the upper housing 11. The case 71 houses a bevel gear 77 and pinion 78 keyed, respectively, on the worm shaft 58 and on a forwardly extending steering shaft 74. For journaling the latter the front wall of the case 71 is provided with a boss portion 75 having a stepped bore as a bearing for the hub of the pinion 78 and to hold the steering shaft against forward endwise movement relative to the gear 77.

The steering shaft 74 has an intermediate section 74b which may be a rubber tube reinforced with wire mesh 76 so as to be torsion resistant for turning the pinion 78, and yet flexible enough to bend upwardly at its rear end responsive to tilt-up of the power leg 10 about the pins 13—13 and to return to its original shape when the power leg is again lowered to a normal driving position. High-pressure hose has been found suitable for this purpose. Clamps 79 grip the end portions of the flexible section 74b and have their other ends locked as by screw pins 73 to the interfitting ends of the front and rear rigid sections 74a and 74c.

As shown in FIGS. 2 and 5, the front section 74a of the steering shaft passes forwardly through the mounting plate 14, transom 29 and back plate 15 to a connector case 80 which receives a tube 81 and holds it at right angles to the steering shaft 74. A rack 82 is slidably mounted in this tube 81 and is actuated by a push-pull cable 83 leading to a rack and steering wheel operated pinion (not shown) in the pilot house. The tube 81 is generally parallel to the boat transom 29 and is longitudinally slotted in the connector 80 to receive a pinion 84 for the rack 82, this pinion being mounted on the front section 74a of the steering shaft. Suitable bearings 85 for this section 74a are provided in the connector case 80. With this steering arrangement turning of the steering wheel in the pilot house operates the push-pull cable 83 via a rack and pinion and responsively turns the pinion 84 by the rack 82. This turning of the pinion 84 results in turning of the worm 57 via the steering shaft 74, pinion 77, gear 78 and worm shaft 58.

Worm 57 in turn drives a gear 87 which is keyed on the upper end portion of the hollow post 16. This gear 87 bears against the inner race of a thrust roller bearing 88 seated in the cross-wall 18 and is retained by a nut 90 which is threaded onto the upper end of the steering post 16. It will be noted that the upper thrust bearing 88 is opposed by a lower bearing 91 seated in an enlargement 17a at the free end of the boss 17, and that the steering post has an enlarged lower portion formed by a sleeve 16a which provides by its upper end an annular shoulder for seating against the inner race of this lower thrust bearing. The sleeve 16a may be cast and is fixed to the steering post 16, which is preferably of stainless steel. Subjacent the bearing 91 the sleeve 16a has an integral flange plate 92 which holds a sealing ring 95 in place for the bearing 91 and is fixed by screws 93 to a cavitation plate 84 forming the upper wall of the lower housing 12. With this arrangement the gear 87 is fixed relative to the lower housing 12 by way of the steering post 16 and its sleeve 16a, flange plate 92, screws 93, and cavitation plate 94. Thus turning of the worm 57 responsive to turning of the boat's steering wheel as above described causes the lower housing 12 to turn relative to the upper housing 11. Also, since the power transfer from the upper housing to the propeller 26 includes the shaft 33 within the steering post 16, steering and power transfer are kept independent of one another.

Directing attention to the lower housing 12 (FIGS. 3–4) such is horizontally split at 12a and the parts are sealed and held together by screws 99. The upper part of the lower housing is cast with a transverse web 96 having a vertical through-bore which receives the thickened lower end portion of the steering post 16. Seated between the lower end of the latter and the pinion 34 are two sets 97–98 of thrust bearings, the upper set 97 being mounted on the shaft 33 and the lower set 98 on the hub of the pinion 34. The upper gear 32 and lower pinion 34 have integral hubs keyed to the shaft 33 and are retained by a head nut 100 and a bottom snap ring 101, respectively. As shown in FIG. 4, the forward and reverse gears instead of having integral hubs, are splined to elongated hubs 102–103 which are journaled on the propeller shaft 25. These hubs are journaled by roller bearings 104–105 which are positioned at the base of the web 96 by caps 104a–105a. Respective nuts 108 retain the gears 35–36. In addition to the bearings 104–105, the shaft 25 has end thrust bearings 106–107 with the former being housed in a tubular cap 109 having outer sealing rings 110. This cap is bolted in place at 111 and extends inwardly beyond the bearing 106 to receive a bushing 112.

The clutches 23–24 are identical and so like identifying numerals will be applied to the respective parts thereof. Each has a hub 113 which is best shown in FIG. 10, is internally splined on the propeller shaft 25 and is externally splined to interfit with the internal splines of a set of driven annular friction plates 114. The latter are alternated with a set of mating driving plates 115 which are free to turn on the clutch hub 113 but have radially projecting spline lugs 115a which interfit with spline grooves in the inner face of a tubular clutch housing 116. At its inner end this clutch housing interfits with the related gear hub 102 or 103 and at its outer end is closed by a retainer 117 which is held against endwise movement by a snap-ring 119. This retainer is formed at its inner end with an annular piston chamber 118 facing toward the clutch plates 114–115 and at its outer end has a boss 117a with a fluid passage 117b extending from the piston chamber to the circumferential face of the boss. Working in the chamber 118 is a ring-like piston 120 which is formed with an inner pressure lip 120a projecting toward the clutch hub 113. The free end of this lip bears against the inner end of a set of radially extending levers 121 which have their outer fulcrum ends seated in an annular groove 122 formed in the inside wall of the clutch housing 116. At about one-third of the distance from their outer fulcrum ends to their inner piston-engaged ends, the levers 121 bear against a pressure plate 123 taking the form of a slide ring which in turn bears against the clutch plates 114–115. To keep the levers 121 in regular circumferentially spaced relation the pressure plate 123 has an intermediate annular lip 123a which is directed toward the piston 120 radially outward of its pressure lip 120a and has a respective radial groove 123b to receive each of the levers 121. With this arrangement fluid pressure applied to the outer face of the piston 120 forces the pressure lip 120a thereof against the inner ends of the levers 121 and this force is multiplied by the levers as a force against the lip 123a of the pressure plate. This multiplied force is in turn applied by the pressure plate to the clutch plates 114–115 thereby coupling the propeller shaft to the respective forward or reverse gear hub 102 or 103.

Pressure fluid is selectively fed to the forward and reverse clutches through tubes 126–127 which are connected at their lower ends to slip rings 124 journaled on the retainer bosses 117a at the outer ends of the clutches. These slip rings have an inner circumferential groove 124a communicating with the passage 117b and having a radial port to the respective tube 126 or 127. From the slip-rings the tubes 126–127 pass through opposite sides of the web 96 and steering post 16 into the gap between the vertical shaft 33 and the steering post. The tubes then thread upwardly in this gap and out the open upper end of the steering post at which point they connect to flexible tubing sections 126a–127a and continue rearwardly in the cavity 50 and upwardly through the passage 56 to the block 37. These flexible sections 126a–127a permit the lower housing 12 and steering post 16 to turn relative to the upper housing while oil is selectively fed under pressure from the block 37 to the hydraulic clutches 23–24. Selection is made in the block 37 by a rotary valve 128 mounted in a bore 130 on the right side thereof and turned by a lever 131 which is connected by the stem 132 extending from the valve through the right wall of the upper housing 11.

The lever 131 is actuated by a sheathed push-pull flexible cable 133 extending to a shift control lever in the pilot house. Accurate positioning is aided by a spring-loaded ball 134 arranged to seat in three circumferentially spaced detents 135 in the top of the selector valve, the rear detent corresponding to forward drive, the center detent to neutral, and the front detent to reverse drive. As shown in FIG. 8, the bore 130 for the selector valve has an inlet passage 137 to its base which extends to a bushing 136 for the pump shaft 47 and then continues upwardly at right angles by passage 138. This passage is in turn intersected intermediate its length by the forward end of a fore-and-aft passage 139 leading from the outlet of the pump 22. The upper end portion of the passage 138 is enlarged to provide a beveled seat 140 for a relief valve 141 having a tapered head 114a formed with a bleed slot 142. A spring 143 encircles the stem 141b of the relief valve and is seated between the head of the valve and a retainer plug 144 which has a center bore 144a slidably receiving the valve stem. Immediately above the seat 140 the passage 138 is intersected by an exhaust passage 145 discharging into the reservoir 20. The inlet passage 137 continues outwardly into the center of the selector valve as a valve bore 146 and then extends radially of the valve as a feed port 147. Thus it is seen that the discharge from the pump 22 communicates with the feed port 147 in the selector valve via the passages 139, 138 and 137, and the valve bore 146, and bleeds to the reservoir 20 via the passages 139 and 138, and relief valve slot 142, and the exhaust passage 145. In case of flow stoppage at or beyond the selector valve the bleeding past the relief valve 140 is expanded the necessary amount by unseating the valve in opposition to the spring 143.

The operation of the selector valve 128 is shown schematically in FIGS. 11–14 wherein it will be noted that the bore 130 for the valve is intersected by upper and lower exhaust passages 150–151 and forward and reverse passages 152–153, respectively. It will also be noted that the valve is formed with a circumferential groove 154 centered diametrically opposite the port 147 and encompassing the arcuate span between the passages 152–153. As indicated in FIG. 14, the upper exhaust passage 150 connects by a line 155 with a passage 156 in the housing 157 of a lift control valve unit 158. This unit, as can be seen in FIG. 2, is mounted on the right wall of the upper housing 11 and has the stem 160a of its rotary valve 160 passing through the cover of the drive housing to receive a lift control knob 159. At its forward end the unit 158 has a line 161 leading from a radial passage 162 to an opening in the right wall of the drive housing from whence a line 161a extends to the rear of a hydraulic lift cylinder unit 163 whose piston, rod and housing are numbered 164, 165 and 166 respectively. The free forward end of the piston rod 165 is provided with an eye 167 which is pivoted on a pin 168 between a pair of pierced ears 170 projecting rearwardly as integral parts of the mounting plate 14, while at its rear, the cylinder housing 166 has an eye 171 pivoted on a bolt pin 172 which projects from the drive housing. A line 173 connects the front of the cylinder 163 with the reverse passage 153 in the block 37 and the reverse passage is also connected to the tube 127 from the reverse clutch 24. Similarly, the tube 126 from the forward clutch 23 is connected to the mouth of the forward passage 152.

As indicated in FIG. 14, the lift control valve 160 has a pair of chordal passages 174–175 each spanning ninety degrees of arc and the housing 157 has a pair of exhaust passages 176–177 alined, respectively, with the right angle passages 162 and 156. When the lift control valve 160 and selector valve 128 are placed in the positions shown in FIG. 14 the power leg will be lifted about the axis of the pins 13 by action of the hydraulic cylinder 163. To elaborate, pressure fluid will be supplied from the pump 22 to the port 147 of the selector valve in the manner afore-described from whence it passes through the passage 150 and line 155 to the selector valve, and then through the passages 156, 174 and 162, and line 161 to the rear end of the cylinder 166. Any fluid in the opposite end of the cylinder is free to vent to the reservoir through the line 173, passage 153, groove 154, and exhaust passage 151. Hence, the cylinder 166 will be forced rearwardly relative to the piston 164 thereby forcing the power leg to swing upwardly until either the forward end of the cylinder 166 comes to bear against the piston or the lift control valve 160 is turned to move the valve passage 174 out of registration with the passages 156 and 162 in the housing 157. To lower the power leg back into normal operating position the lift control valve is turned ninety degrees, clockwise for example, to cross-connect the passages 156 and 176 by the chordal passages 175 and to cross-connect by the other chordal passage 174 the passages 162 and 177. In this way the hydraulic cylinder 163 can dump to the reservoir via line 161, passage 162, chordal passage 174, and exhaust passage 177, and the discharge from the pump, if the engine is running, can dump after reaching the selector valve, via passage 150, line 155, passage 156, chordal passage 175, and exhaust passage 176.

In FIGS. 11–14 the inner ends of the passages 150, 152, and 153 have been schematically illustrated for purposes of example as being 120 degrees apart circumferentially of the bore 130 for the selector valve 128 and the valve groove 154 has been correspondingly given an arcuate length of slightly greater than 120 degrees. This arrangement would necessitate a 240 degree swing range for the lever 131, and so, to minimize this swing range, in actual practice the passages 152 and 153 are made to intersect the bore 130 at points disposed about 30 degrees on opposite sides of the upper exhaust passage 150, and the valve groove 154 is doubled in length to slightly more than 240 degrees. Then, in order that the lower exhaust passage 151 will only be in communication with the valve groove 154 when the valve is in the neutral position of FIG. 1, the passage 151 is located in spaced relation axially of the valve 128 from the other passages 150, 152 and 153 as shown in FIG. 8, and the valve groove 154 is given a correspondingly widened central portion 154 arranged to register with the passage 151 when the selector valve is in neutral position.

The oil pump 22 is preferably self-reversing so that the same power leg can be used without modification of the drive mechanism therein for either direction of rotation of the engine output shaft 27. In the illustrated embodiment, the input shaft 47 of the pump has a front rotor 180 with rearwardly projecting teeth 181 evenly spaced around the periphery thereof. These teeth 181 mesh with part of the teeth 182 of an eccentrically mounted idler gear 183 which rotates on a stud 184 projecting forwardly off-center of a circular back plate 185. The latter is journaled in a rear cap 186 having an annular mounting flange 187 bolted at 188 to the back of the block 37. In this regard, the block is bored and counterbored at the rear to receive and match the rotor 180 and mounting flange 187, and the bore is enlarged at 190 and 191 to provide inlet and outlet ports, respectively. An inlet passage 192 from the bottom of the block 37 leads from the reservoir to the inlet port 190 while the outlet port 191 is intersected by the passage 139 to feed the selector valve 128 as before described. Directing attention to the back plate 185, at the front it presents a forwardly projecting crescent-shaped partition 193 disposed between the rotor teeth 181 and the idler 183 through part of the travel thereof; and namely, that part which is diametrically opposite the location of intermesh between the rotor and idler teeth 181–182. At the rear the back plate 185 presents a rearwardly projecting step 194 having parallel stop faces 194a–b arranged to engage the chordal face 195a of a segmental shaped cross-wall 195 in the cap 186 upon rotation of the back plate. When the pump shaft 47 turns clockwise when viewed from the rear of the power leg the stop face 194a engages the face 195a and locates the crescent partition 193 as shown in the drawing. If the engine rotation were then reversed the frictional drag of the idler on the back plate would cause it to turn counter-clockwise until the stop face 194b engaged the face 195a and thereby positioned the crescent partition 193 in proper position. Thus the discharge port for the pump remains the same for both directions of rotation, and since the drive mechanism in the power leg is also operable for either direction of rotation of the input shaft, the power leg of the present invention can be used without modification for either a right or left hand screw.

The coupling 28 comprises a pair of like intermeshing units 28a–28b having hubs keyed, respectively, to the engine output shaft 27 and the input shaft 30 of the power leg, and retained thereon by snap rings 196. Each half of the coupling has a plurality of evenly spaced teeth 197 projecting endwise therefrom and diverging somewhat relative to the longitudinal axis of the coupling. The free ends of these teeth have a rounded taper and the portions 198 of the hub between the teeth are beveled for engagement by the tips of the teeth of the other half of the coupling. When the power leg is down in the normal drive position all of the teeth of the coupling are meshed in driving contact circumferentially speaking, and have their tips spaced endwise somewhat from the beveled end portions 198 of the opposing hub. At this time the swing axis defined by the pins 13—13 is midway between the units 28a–28b, but is spaced above the longitudinal axes thereof as indicated in FIG. 3 to coincide with the uppermost point of the pitch line of the coupling. Then, when the power leg tilts up about the pins 13 responsive to striking an obstruction or is hydraulically lifted by use of the cylinder 163, the upper teeth of the rear unit 28b swing forwardly toward those of the front unit 28a while the lower teeth of unit 28b swing rearwardly out of mesh. At the completion of a ninety degree upward swing of the power leg the uppermost teeth of each coupling half will still be fully in mesh with one another and the two teeth on either side will be partially meshed. Thus when the forward clutch 23 is engaged, a drive connection is maintained from the engine to the propeller during the full range of the power leg tilt-up.

As shown in FIG. 2 the mounting plate 14 has a boss 140 extending forwardly through openings in the transom 29 and the back-up plate 15 to house thrust bearings 198–199 for the shaft 27. The latter has an enlarged portion 27a providing by its ends shoulders for the seating of the inner races of the bearings 198–199 against the shaft, while the outer races thereof seat, respectively, against a forward retainer 200 and a rear annular shoulder formed in the boss by a rear necking of the bore 146 thereof. Cap screws 201 hold the retainer 200 in place, and bushings 202–203 seal the ends of the bore 146.

For ease of removal the pins 13 are held in place by snap rings 13a at their ends and the pin 168 at the forward end of the hydraulic cylinder 163 is retained by a cotter 168a. Since the halves of the coupling 28 are not tied to one another, the entire power leg and hydraulic cylinder 163 can be removed from the transom 29 merely by removing the pins 13—13 and 167, and disconnecting the steering at one of the ends of the flexible section 74b by removal of one of the screw pins 73.

For ease of steering, there may be provided a torque-countering vane 204 which is set at an acute angle with the propeller axis so that the propeller wash against the vane exerts a force component transverse to the propeller axis in the direction creating a torque about the steering axis which is opposite to the propeller torque. When set as in FIG. 1, the vane 204 is for a right-hand propeller. For mounting the vane the rudder portion 126 of the lower housing 12 is formed near its tip with a rearwardly facing bore 205 which receives the forward end of a rearwardly reaching arm 206 of round bar stock. At its near end this arm bends upwardly and continues as a leg 207 to socket in a fitting 208 which is secured as by bolts 209 to the underside of the cavitation plate 94 at its aft end. The vane 204 is in turn welded or otherwise fixed to the leg 207 at the desired angle.

It is thought that the invention will have been clearly understood from the foregoing detailed description. Changes in the details of construction will suggest themselves and may be resorted to without departing from the spirit of the invention, wherefore it is my intention that no limitations be implied and that the hereto annexed claims be given a scope fully commensurate with the broadest interpretation to which the employed language fairly admits.

I claim:

1. In a marine outdrive assembly, a power leg having an upper housing and a propeller housing, a propeller shaft journal-mounted in said propeller housing, a bevel gear freely encircling said propeller shaft, a multiple-disc hydraulic clutch in said housing for selectively coupling said gear to said propeller shaft, said clutch comprising a hydraulic cylinder driven by said gear and having a ring-piston therein, a driving set of ring-discs in said cylinder splined thereto and a driven set of ring-discs dispersed between the ring-discs of said driving set and splined relative to said propeller shaft whereby said gear is coupled to said propeller shaft responsive to clutch engaging hydraulic pressure applied to said piston, said cylinder, ring-piston and sets of ring-discs encircling said propeller shaft flexible tube means extending between said housings, a hydraulic system in said upper housing for selectively supplying fluid under pressure to said piston via said flexible tube means for responsively forcing said sets of ring-discs together to thereby selectively engage the clutch, steering means for steering said propeller housing relative to said upper housing about a steering axis coinciding with the longitudinal axis of said upright shaft, and tilt-up means for swinging said power leg upwardly about a swing axis spaced above the level of said propeller shaft.

2. The marine outdrive assembly of claim 1 in which force multiplying means is positioned between said piston and said sets of ring-discs.

3. The marine outdrive assembly of claim 2 in which said force multiplying means comprises a set of radial levers fulcrumed at their outer ends on said cylinder and engaged near their inner ends by said piston, and a slidable ring between said levers and sets of ring-discs and engaged by said levers intermediate their ends.

4. In a marine outdrive assembly, a power leg having an upper housing and a propeller housing, a propeller shaft journal-mounted in said propeller housing, a bevel gear freely encircling said propeller shaft and having an elongated hub fixed thereto and extending oppositely from the teeth of the gear by an outer end, a hydraulic clutch comprising a cylinder coupled by its inner end to said outer end of the gear hub to hold the cylinder against rotation relative to the gear hub and against endwise motion away from the gear hub, a driving set of ring-discs in said cylinder splined thereto and a driven set of ring-discs alternated with the ring-discs of said driving set and splined relative to said propeller shaft, a slide ring between said sets of ring-discs and the outer end of said cylinder, a set of radial levers fulcrumed at their outer ends on said cylinder and engaging said slide ring intermediate the ends of the levers, a ring-piston between said levers and the outer end of said cylinder for engaging the inner ends of said levers to force said sets of ring-discs together, and an outer end plate on said cylinder and providing a fluid pressure chamber at the outer end of said piston, a flexible fluid conductor extending between said housings, a hydraulic system in said upper housing for selectively supplying fluid under pressure to said chamber via said flexible fluid conductor for selectively engaging and disengaging said clutch, drive means for driving said gear including an upright shaft projecting upwardly into said upper housing at right angles to said propeller shaft from said propeller housing and a bevel pinion fixed on the lower end of said upright shaft and meshing with said gear, steering means for steering said propeller housing relative to said upper housing about a steering axis coinciding with the longitudinal axis of said upright shaft, and tilt-up means for swinging said upper housing upwardly about a swing axis spaced above the level of said propeller shaft.

5. In combination with the structure of claim 4, a slip ring journaled on said end plate, and said flexible fluid conductor being connected to said slip ring, said slip ring and end plate providing a fluid passage from said line to said chamber.

6. The marine outdrive assembly of claim 4 in which said hydraulic system includes a self-reversing hydraulic pump in said upper housing, and said drive means includes an input shaft having drive connections with said pump and said upright shaft.

7. In a marine outdrive assembly, a non-steerable upper housing providing a sump, a steerable propeller housing with an upright steering tube projecting into said upper housing and journaled therein, steering means operatively connected to the upper end of said steering tube for selectively turning the propeller housing relative to said upper housing about an upright steering axis, a propeller shaft journal-mounted in said propeller housing with its longitudinal axis at right angles to said steering axis, a rotary hydraulic pump in said upper housing taking suction from said sump, a hydraulic clutch on said propeller shaft, an input shaft journal-mounted in said upper housing in parallel relation to said propeller shaft and having a driving connection with said pump, driving means from said input shaft to said clutch including an upright shaft in said steering tube with its longitudinal axis coinciding with said steering axis, flexible fluid conductor means communicating with said clutch and extending upwardly to said upper housing, a control valve in said upper housing communicating with the fluid output of said pump and selectively communicating said output with said conductor means and communicating said conductor means and output with said sump for respectively engaging and disengaging said clutch.

8. The marine outdrive assembly of claim 7 in which said upper housing has tilt-up means for swinging said housings upwardly about a tilt axis and said input shaft has flexible coupling means with a flexing axis constantly coinciding with said tilt axis, said tilt axis being spaced above the longitudinal center axis of said input shaft.

9. The marine outdrive assembly of claim 7 in which there is a mounting plate, tilt-up means between said upper housing and said mounting plate for swinging said housings upwardly relative to said mounting plate about a generally horizontal swing axis, a hydraulic cylinder assembly linked between said mounting plate and upper housing, and means for selectively connecting said pump output with said hydraulic cylinder assembly for tilting up said housings.

10. In a marine outdrive assembly, a power leg adapted to be carried by a boat hull for tilt-up about a starboard-port swing axis, forward and reverse propulsion means carried by said power leg, extendable combination hold-down and tilt-up means extending between said boat hull and said power leg, hydraulic shift means for said propulsion means whereby said propulsion means can be selectively placed in forward drive, reverse drive, or neutral, and control means for automatically placing said combination means in hold-down condition when said propulsion means is in reverse drive to prevent extension of the combination means and tilt-up of the power leg, for selectively placing said combination means in tilt-up condition when said propulsion means is in neutral to extend said combination means and thereby tilt-up the power leg, and for automatically deactivating the hold-down and tilt-up functions of said combination means when said propulsion means is in forward drive to permit extension of the combination means and tilt-up of the power leg responsive to engagement of the power leg with an obstruction.

11. In a marine outdrive assembly, mounting means for a boat hull, a power leg carried by said mounting means for tilt-up about a starboard-port swinging axis, a propeller journal-mounted at the lower end of said power leg, forward and reverse drive means in said power leg for said propeller, extendable combination hold-down, tilt-up and shock absorber means extending between said mounting means and said power leg, hydraulic shaft means for said drive means whereby said propeller can be selectively placed in forward drive, reverse drive, or neutral, and control means on said power leg for automatically placing said combination means in hold-down condition when said propeller is in reverse drive to prevent extension of the combination means and tilt-up of the power leg, for selectively placing said combination means in tilt-up condition when said propeller is in neutral to extend said combination means, and for automatically placing said combination means in shock absorber condition when said propeller is in forward drive to yieldingly resist extension of the combination means and tilt-up of the power leg while permitting such tilt-up responsive to engagement of the power leg with an obstruction.

12. In a marine outdrive assembly, mounting means for a boat hull, a power leg carried by said mounting means for tilt-up about a starboard-port swing axis, a propeller shaft journal-mounted at the lower end of said power leg, forward and reverse drive means in said power leg for said propeller shaft, extendable hydraulic combination hold-down, tilt-up and shock absorber means extending between said mounting means and said power leg, forward and reverse hydraulic clutch means for said forward and reverse drive means whereby said propeller shaft can be selectively placed in forward drive, reverse drive, or neutral, a supply of pressure fluid and a sump in said power leg, hydraulic control means operatively associated with said fluid supply, sump, clutch means and combination means for simultaneously engaging said reverse clutch means and placing said combination means in hold-down condition to prevent extension of the combination means and tilt-up of the power leg when said propeller shaft is in reverse drive, for selectively placing said combination means in tilt-up condition when said propeller shaft is in neutral to extend said combination means and thereby tilt-up the power leg, and for simultaneously engaging said forward clutch means and placing said combination means in shock absorber condition when said propeller shaft is in forward drive to yieldingly resist extension of the combination means and tilt-up of the power leg while permitting such tilt-up responsive to engagement of the power leg with an obstruction.

13. In a marine outdrive assembly, mounting means for a boat hull, a power leg carried by said mounting means for tilt-up about a starboard-port swing axis, a propeller shaft journal-mounted at the lower end of said power leg, forward and reverse drive means in said power leg for said propeller shaft, an extendable hydraulic piston and cylinder assembly having its piston and cylinder pivotally interconnected, one with the power leg and the other with said mounting means whereby said piston travels in said cylinder from a first end to a second end thereof during tilt-up of the power leg, forward and reverse hydraulic clutches for said forward and reverse drive means whereby said propeller shaft can be selectively placed in forward drive, reverse drive, or neutral, a sump in said power leg, a hydraulic pump driven by said drive means and taking its suction from said sump, and hydraulic control means for selectively connecting the output of said pump with said first end of the cylinder and dumping said second end of the cylinder and said clutches to the sump whereby said assembly is hydraulically extended to tilt-up said power leg with said propeller shaft in neutral, for selectively dumping the output of said pump and said clutches to said sump whereby said propeller shaft is placed in neutral without tilt-up of the power leg, for selectively connecting the first end of said cylinder with said sump and the output of said pump with said second end of the cylinder and with said reverse clutch whereby said propeller shaft is placed in reverse drive and said power leg is held down from tilt-up by said assembly, and for selectively connecting the output of the pump with said forward clutch and the ends of said cylinder with said sump whereby said propeller shaft is placed in forward drive with said assembly yieldingly resisting tilt-up and tilt-down of said power leg.

14. In a marine outdrive assembly, mounting means for a boat hull, a power leg having a non-steerable upper housing carried by said mounting means for tilt-up about a starboard-port swing axis and having a steerable propeller housing with an upright steering tube projecting into said upper housing and journaled therein, steering means operatively connected to the upper end of said steering tube for selectively turning the propeller housing relative to said upper housing about an upright steering axis, a propeller shaft journaled-mounted in said propeller housing with its longitudinal axis at right angles to said steering axis, a sump in said upper housing, a rotary hydraulic pump in said upper housing taking suction from said sump, an input shaft to said upper housing coupled to said pump, forward and reverse clutches on said propeller shaft whereby said propeller shaft can be selectively placed in forward drive, reverse drive, or neutral, forward and reverse driving means from said input shaft to said clutches including an upright shaft in said steering tube with its longitudinal axis coinciding with said steering axis, forward and reverse hydraulic lines from respective said clutches extending upwardly in said steering tube outwardly of said upright shaft, an extendable hydraulic piston and cylinder assembly having its piston and cylinder pivotally interconnected, one with said upper housing and the other with said mounting means whereby said piston travels in said cylinder from a first end to a second end thereof during tilt-up of the power leg, and hydraulic control means in said upper housing operatively associated with said pump-cylinder, sump, and said clutches via said lines, for selectively connecting the output of said pump with said first end of the cylinder and dumping said second end of the cylinder and said clutches to the sump whereby said assembly is hydraulically extended to tilt-up said power leg with said propeller shaft in neutral, for selectively dumping the output of said pump and said clutches to said sump whereby said propeller shaft is placed in neutral without tilt-up of the power leg, for selectively connecting the first end of said cylinder with said sump and the output of said pump with said second end of the cylinder and with said reverse clutch whereby said propeller shaft is placed in reverse drive and said power leg is held down from tilt-up by said assembly, and for selectively connecting the output of the pump with said forward clutch and the ends of said cylinder with said sump whereby said propeller shaft is placed in forward drive with said assembly yieldingly resisting tilt-up and tilt-down of said power leg.

15. In a marine outdrive assembly, a power leg having an upper housing and a steerable lower propeller housing, means for swingably mounting said upper housing outboard of a boat hull for tilt-up of the power leg about a horizontal tilt axis at the forward side thereof, a steering post projecting upwardly from said propeller housing into said upper housing rearward of said tilt axis, a worm gear on the upper end of said steering post, a horizontal worm shaft journaled in said upper housing parallel to said tilt axis and meshing with said worm gear, a bevel gear on one end of said worm shaft, a fore-and-aft extending steering shaft journaled near its aft end on said upper housing and extending forwardly of the power leg, a bevel pinion on the rear end of said steering shaft meshing with said bevel gear, and means operatively connected to the forward end of said steering shaft for selectively turning it in either direction of rotation to responsively steer said lower propeller housing via said bevel pinion and gear, worm shaft and worm gear, and steering post, said steering shaft being held against endwise movement at its ends and having an intermediate elongated flexible torsion-resistant section adapted to bend responsive to tilt-up of the power leg and to transmit torque from the forward end of the steering shaft to said bevel pinion.

16. In a marine outdrive assembly, a power leg having an upper housing and a steerable lower housing, means for swingably mounting said upper housing outboard of a boat hull for tilt-up of the power leg about a horizontal tilt axis at the forward side thereof, propulsion means carried by said lower housing, drive means for said propulsion means including an input shaft from said boat hull to said upper housing having its longitudinal center axis spaced below said tilt axis, and flexible coupling means interrupting said input shaft and having a flexing axis constantly coinciding with said tilt axis whereby said power leg can be tilted up without interruption of the drive from the boat hull.

17. In a marine outdrive assembly, a power leg having an upper housing and a steerable lower housing, means for swingably mounting said upper housing outboard of a boat hull for tilt-up of the power leg about a horizontal tilt axis at the forward side thereof, propulsion means carried by said lower housing, drive means for said propulsion means including an input shaft to said upper housing from said boat hull having its longitudinal center axis spaced below said tilt axis, and flexible coupling means interrupting said input shaft, said coupling means comprising a pair of spaced hubs having opposed intermeshing teeth projecting longitudinally of the hubs and evenly spaced circumferentially thereof, the free ends of said teeth being rounded and the portions of the hubs between the teeth being beveled inwardly toward the opposed free ends of the hubs whereby the axes of said hubs can be inclined relative to one another at a constant flexing axis coinciding with said tilt axis responsive to tilt-up of the power leg without interrupting drive between said hubs via the upper teeth.

18. In a marine outdrive assembly, a power leg having an upper housing and a steerable lower propeller housing, means for swingably mounting said upper housing outboard of a boat hull for tilt-up of the power leg about a horizontal tilt axis at the forward side thereof, a hollow steering post projecting upwardly from said propeller housing into said upper housing, a worm gear on the upper end of said steering post, a horizontal worm shaft journaled in said upper housing parallel to said tilt axis and meshing with said worm gear, a bevel gear on one end of said worm shaft, a fore-and-aft extending shaft journaled near its aft end on said upper housing and extending forwardly of the power leg, a bevel pinion on the rear end of said steering shaft meshing with said bevel gear, means operatively connected to the forward end of said steering shaft for selectively turning it in either direction of rotation to responsively steer said lower propeller housing via said bevel pinion and gear, worm shaft and worm gear, and steering post, said steering shaft being held against endwise movement at its ends and having an intermediate elongated flexible torsion-resistant section adapted to bend responsive to tilt-up of the power leg and to transmit torque from the forward end of the steering shaft to said bevel pinion, a propeller shaft journal-mounted in said drive housing, a lower bevel gear freely encircling said propeller shaft, a hydraulic clutch in said housing for selectively coupling said gear to said propeller shaft, an upright drive shaft extending freely through said steering post into said upper housing, a bevel pinion on the lower end of said upright shaft and meshing with said lower gear, a hydraulic system for selectively engaging and disengaging said clutch including a rotary hydraulic pump in said upper housing having a fore-and-aft extending pump drive shaft, an upper bevel gear on the upper end of said upright shaft above said steering post, a fore-and-aft extending input shaft having rear and front sections inter-associated by coupling means and having its longitudinal center axis below said tilt-up axis, said rear section being journal-mounted in said upper housing and connected at its rear end to said pump drive shaft and projecting by its front end forwardly of said upper housing, and a bevel pinion on said rear section meshing with said upper bevel gear, said coupling means comprising a pair of spaced hubs on the opposed ends of said front and rear sections of the input shaft, said hubs having opposed intermeshing teeth projecting longitudinally of the hubs and evenly spaced circumferentially thereof, the free ends of said teeth being rounded and the portions of the hubs between the teeth being beveled inwardly toward the opposed free ends of the hubs whereby the axes of said hubs can be inclined relative to one another responsive to tilt-up of the power leg without interrupting drive between said hubs via the upper teeth.

19. In a marine outdrive assembly, mounting means for a boat hull, a power leg carried by said mounting means for tilt-up about a starboard-port swing axis, a propeller journal-mounted at the lower end of said power leg, forward drive means in said power leg for said propeller, extendable hydraulic combination tilt-up and shock absorber means extending between said mounting means and said power leg, hydraulic shift means for said drive means whereby said propeller can be selectively placed in forward drive or neutral, a supply of pressure fluid and a sump in said power leg, hydraulic control means operatively associated with said fluid supply, sump, shift means and combination means for selectively placing said combination means in tilt-up condition when said propeller is in neutral to extend said combination means and thereby tilt-up the power leg, and for simultaneously engaging said hydraulic shift means and placing said combination means in shock absorber condition when said propeller is in forward drive to yieldingly resist extension of the combination means and tilt-up of the power leg while permitting such tilt-up responsive to engagement of the power leg with an obstruction.

20. In a marine outdrive assembly, mounting means for a boat hull, a power leg carried by said mounting means for tilt-up about a starboard-port swing axis, a propeller shaft journal-mounted at the lower end of said power leg, forward and reverse drive means in said power leg for said propeller shaft, extendable hydraulic combination hold-down and shock absorber means extending between said mounting means and said power leg, forward and reverse hydraulic clutch means for said forward and reverse drive means whereby said propeller shaft can be selectively placed in forward drive, reverse drive, or neutral, a supply of pressure fluid and a sump in said power leg, hydraulic control means operatively associated with said fluid supply, sump, clutch means and combination means for simultaneously engaging said reverse clutch means and placing said combination means in hold-down condition to prevent extension of the combination means and tilt-up of the power leg when said propeller shaft is in reverse drive and for simultaneously engaging said forward clutch means and placing said combination means in shock absorber condition when said propeller shaft is in forward drive to yieldingly resist extension of the combination means and tilt-up of the power leg while permitting such tilt-up responsive to engagement of the power leg with an obstruction.

21. In a marine outdrive assembly, a power leg, means for mounting said power leg outboard of a boat hull for tilt-up of the power leg about a horizontal tilt axis, propulsion means on said power leg, drive means for said propulsion means including an input shaft to said power leg from the boat hull having its longitudinal center axis spaced below said tilt axis, and flexible coupling means interrupting said input shaft and having a flexing axis constantly coinciding with said tilt axis whereby said coupling means can be flexed responsive to tilt-up of the power leg without interruption of the drive from the boat hull.

22. In a marine outdrive assembly, means for detachably mounting said power leg outboard of a boat hull for tilt-up of the power leg about a horizontal tilt axis, propulsion means on said power leg, drive means for said propulsion means including an input shaft to said power leg from the boat hull having its longitudinal center axis spaced below said tilt axis, and flexible coupling means interrupting said input shaft and having a flexing axis constantly coinciding with said tilt axis whereby said coupling means can be flexed responsive to tilt-up of the power leg without interruption of the drive from the boat hull, said coupling means comprising a pair of meshing coupling members which are adapted to be separated from one another solely by bodily movement of said power leg away from said boat hull after the power leg is otherwise detached relative to the boat hull.

23. The combination of claim 22 in which said pair of coupling members comprises a pair of spaced hubs having opposed intermeshing teeth projecting longitudinally of the hubs and evenly spaced circumferentially thereof, the free ends of said teeth being rounded and the portions of the hubs between the teeth being beveled inwardly toward the opposed free ends of the hubs whereby the axes of said hubs can be inclined relative to one another at a constant flexing axis coinciding with said tilt axis responsive to tilt-up of the power leg without interrupting drive between said hubs via the upper teeth.

24. In a marine outdrive assembly, a power leg having an upper housing and a steerable lower propeller housing, means for swingably mounting said upper housing outboard of a boat hull for tilt-up of the power leg about a horizontal tilt axis at the forward side thereof, a propeller shaft journal-mounted in said propeller housing, drive means for said propeller shaft including an input shaft to said upper housing from said boat hull having its longitudinal center axis spaced below said tilt axis, and flexible coupling means interrupting said input shaft and having a flexing axis coinciding with said tilt axis, hydraulic clutch means in said propeller housing for said propeller shaft, and a hydraulic system in said upper housing operatively connected with said clutch means via a flexible fluid conductor extending between said housings and flexing responsive to steering of said propeller housing relative to said upper housing, said hydraulic system being operatively associated with said input shaft to derive its energy therefrom.

25. The structure of claim 24 in which said hydraulic clutch means includes a slip ring encircling said propeller shaft and connected to said fluid conductor.

26. The structure of claim 24 in which said upper housing has a sump and said hydraulic system includes a pump taking suction from said sump and driven by said input shaft.

27. In a marine outdrive assembly, a power leg having upper and lower housings, means for steering said lower housing relative to said upper housing, a propeller shaft journal-mounted in said lower housing, a drive system for turning said shaft including hydraulic clutch means encircling said shaft and adapted to give non-slippage drive of said shaft when engaged, said clutch means having a pressure chamber, control means in said upper housing for selectively engaging and disengaging said clutch means, a slip ring journaled on said clutch and having a through passage with its inner end communicating with said pressure chamber, and flexible fluid conductor means between said control means and said slip ring and communicating with the outer end of said through passage.

28. In a marine outdrive assembly, a power leg having an upper housing and a steerable lower housing, means for swingably mounting said upper housing outboard of a boat hull for tilt-up of the power leg about a horizontal tilt axis at the forward side thereof, propulsion means in said lower housing, drive means for said propulsion means including an input shaft to said upper housing from said boat hull having its longitudinal center axis spaced below said tilt axis, and flexible coupling means interrupting said input shaft and having a flexing axis coinciding with said tilt axis, hydraulic shift means in said lower housing for said propulsion means, and a hydraulic system in said upper housing operatively connected with said shift means via a flexible fluid conductor extending between said housings and flexing responsive to steering of said lower housing relative to said upper housing.

References Cited by the Examiner

UNITED STATES PATENTS

| | | | |
|---|---|---|---|
| 1,743,460 | 1/1930 | Klausmeyer et al. | 192—21 |
| 1,980,685 | 11/1934 | Johnson | 115—41 |
| 2,284,589 | 5/1942 | Rippingdale | 115—34 |
| 2,542,682 | 2/1951 | Kloss | 115—17 |
| 2,669,971 | 2/1954 | Mooney | 192—87 X |
| 2,681,029 | 6/1954 | Canazzi | 115—41 |
| 2,751,799 | 6/1956 | Long | 115—17 X |
| 2,755,766 | 7/1956 | Wanzer | 115—35 |
| 3,006,311 | 10/1961 | Hansson et al. | 115—35 |
| 3,022,745 | 2/1962 | McIntyre | 192—87 X |
| 3,051,119 | 8/1962 | Hamlyn et al. | 115—41 X |
| 3,095,849 | 7/1963 | Breunich | 115—18 |
| 3,136,285 | 6/1964 | Kiekhaefer | 115—35 |

FOREIGN PATENTS

| | | |
|---|---|---|
| 120,070 | 8/1877 | France. |

FERGUS S. MIDDLETON, *Primary Examiner.*